United States Patent
Armangau et al.

(10) Patent No.: US 8,095,804 B1
(45) Date of Patent: Jan. 10, 2012

(54) STORING DELETED DATA IN A FILE SYSTEM SNAPSHOT

(75) Inventors: Philippe Armangau, Acton, MA (US); Michael Kilian, Harvard, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1264 days.

(21) Appl. No.: 11/807,133

(22) Filed: May 25, 2007

(51) Int. Cl.
G06F 11/30 (2006.01)
G06F 13/00 (2006.01)
G06F 7/00 (2006.01)
H04L 29/06 (2006.01)
H04L 9/32 (2006.01)
H04L 9/08 (2006.01)
G06F 11/14 (2006.01)
G06F 17/30 (2006.01)
G06F 12/00 (2006.01)

(52) U.S. Cl. ........ 713/193; 713/165; 713/180; 711/162; 711/164; 707/600; 707/639; 726/22; 380/282

(58) Field of Classification Search .................. 713/193, 713/165, 180; 707/200, 639; 711/162, 164; 380/282; 726/22
See application file for complete search history.

(56) References Cited

U.S. PATENT DOCUMENTS

| 7,093,134 | B1* | 8/2006 | Gong | 713/180 |
| 7,831,560 | B1* | 11/2010 | Spertus et al. | 707/639 |
| 2004/0107222 | A1* | 6/2004 | Venkatesh et al. | 707/200 |
| 2007/0180239 | A1* | 8/2007 | Fujibayashi et al. | 713/165 |

FOREIGN PATENT DOCUMENTS

EP 1643365 A2 * 4/2006

OTHER PUBLICATIONS

Libin Wu; Jinlin Wang; Peng Sun; Jianliang Hu; "A Media File Snapshot Technique Based on Embedded System"; Computer Science and Software Engineering, 2008 International Conference on vol. 4 Digital Object Identifier: 10.1109/CSSE.2008.585; Publication Year: Aug. 2008 , pp. 110-113.*
U.S. Appl. no. 11/807,049, filed May 25, 2007, Philippe Armangau, et al.
U.S. Appl. No. 11/807,070, filed May 25, 2007, Philippe Armangau, et al.
U.S. Appl. No. 11/807,134, filed May 25, 2007, Philippe Armangau, et al.

* cited by examiner

*Primary Examiner* — Matthew Smithers
*Assistant Examiner* — Courtney Fields
(74) *Attorney, Agent, or Firm* — Krishnendu Gupta; Robert Kevin Perkins; Joseph D'Angelo

(57) ABSTRACT

Aspects of the invention relate to creating a snapshot of a file system on an OAS system. A snapshot of a file system is an image of a file system at a particular point in time. A snapshot of a file system may be used to restore the file system to its state at the time of creation of the snapshot in, for example, situations where the file system has become corrupted.

15 Claims, 6 Drawing Sheets

STORING DELETED DATA IN A FILE SYSTEM SNAPSHOT

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

Some OAS system employ file systems to manage storage of objects on one or more storage devices. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an inode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an inode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

As mentioned above, some OAS systems may store content in a file system. FIG. 1 shows an example of such an OAS system 101 that includes an OAS interface 103, a file system 105, and one or more storage devices 107. When OAS Interface 103 receives a request (e.g., from an application program) to store a content unit, the OAS Interface may assign an object identifier to the content unit (which may be generated either by the OAS system, the entity that issued the request, or some other entity), and may issue a request to file system 105 to store the content unit in one or more files. The file system may store the content unit on physical storage device(s) 107, and may store metadata associating the file(s) in which the content of the content unit is stored with the physical location(s) of the content on the physical storage device(s).

When a request to access the content unit (that identifies the content unit using its object identifier) is subsequently received by OAS Interface 103, the OAS Interface determines the file or files in file system 105 that logically store the content of the content unit in any suitable way.

In some OAS systems, when the OAS Interface receives a request to store a content unit and stores the content unit in one or more files in the file system, the OAS Interface may store metadata that associates the object identifier for the content unit with the filename(s) and/or file system location(s) of the file. The OAS Interface may use this metadata to determine the file(s) that store the content of the content unit. In some OAS systems, when the OAS Interface, in response to a request to store a content unit, stores the content of the content unit in one or more file(s) in the file system, the OAS Interface may instruct the file system to give the one or more file(s) a file name that includes all or a portion of the object identifier for the content unit. When a subsequent access request for the content unit (that identifies the content unit using its object identifier) is received, the OAS Interface may determine the file(s) that store the content of the content unit by locating the file(s) that have the object identifier (or a portion thereof) in their filename.

Once the OAS Interface determines the file(s) in file system 105 that store(s) the content of the content unit, the OAS Interface made send a request to the file system to access the file(s). In response, the file system may determine the physical storage location(s) of the content unit on the physical storage device(s), and request the content stored and the determined physical storage location(s) from the physical storage device. Upon receiving the requested content, the file system may return the content to the OAS Interface, which may return it to the requesting entity.

The simplified block diagram of OAS system 101 shows file system 105 directly accessing storage device(s) 107. However, this is provided merely as a simplified example, as file system 105 may access the storage device(s) in any suitable way. For example, in some embodiments file system 105 may access the storage device(s) via a device driver that provides an interface to the storage device(s) or via an operating system that interfaces with the device driver for the storage device(s).

SUMMARY

One embodiment is directed to a method of processing content in a computer system comprising at least one computer that executes an application program that uses an object addressable storage (OAS) interface to access a content unit using an object identifier, the computer system further comprising a file system having a non-OAS storage interface that makes available a plurality of files. The method comprises acts of: (A) providing an OAS layer that receives OAS access requests from the application program for content units in a format compatible with the OAS interface and converts the OAS access requests into file system access requests that are in a format compatible with the non-OAS storage interface provided by the file system; and (B) using a snapshot facility to create a snapshot of the file system at least one point in time to facilitate data recovery in the event that the file system becomes corrupted subsequent to the creating of the snapshot. Another embodiment is directed to at least one computer readable medium encoded with instructions that, when executed, perform the above-described method.

A further embodiment is directed to a computer system for use with an application program that uses an object addressable storage (OAS) interface to access a content unit stored in the computer system using an object identifier. The computer system comprises: a file system having a non-OAS storage interface that makes available a plurality of files; and at least one controller that: provides an OAS layer that receives OAS access requests from the application program for content units in a format compatible with the OAS interface and converts the OAS access requests into file system access requests that are in a format compatible with the non-OAS storage interface provided by the file system; and uses a snapshot facility to create a snapshot of the file system at least one point in time to facilitate data recovery in the event that the file system becomes corrupted subsequent to the creating of the snapshot.

Another embodiment is directed to a method of processing content in a computer system comprising at least one storage device that stores a plurality of content units each identified by an object identifier. The method comprises an act of: (A) in response to a failure in the computer system that results in a loss of at least some of the plurality of content units, providing the object identifier for each of the lost content units. A further embodiment is directed to at least one computer readable medium encoded with instructions that, when executed, perform the above-described method.

Another embodiment is directed to a computer system comprising: at least one storage device that stores a plurality of content units each identified by an object identifier; and at least one controller that: in response to a failure in the computer system that results in a loss of at least some of the plurality of content units, provides the object identifier for each of the lost content units.

A further embodiment is directed to a method of processing content in a computer system comprising at least one computer that executes an application program that uses an object addressable storage (OAS) interface to access a content unit using an object identifier, the computer system further comprising a first file system and a second file system, the first and second file systems each having a non-OAS storage interface that makes available a plurality of files. The method comprises acts of: (A) creating a snapshot of the first file system at least one point in time; (B) receiving, subsequent to creating the snapshot, an OAS access request from the application program to store a content unit, wherein the OAS access request is in a format compatible with the OAS interface; (C) converting the OAS access request into at least one file system access request that is in a format compatible with the non-OAS storage interface provided by the first and second file systems; (D) transmitting the at least one file system access request to store the content unit to the first file system; and (E) transmitting the at least one file system access request to store the content unit to the second file system so that the content unit is stored in both the first and second file systems. Another embodiment is directed to at least one computer readable medium encoded with instructions that, when executed, perform the above-described method.

A further embodiment is directed to a computer system comprising: at least one computer that executes an application program that uses an object addressable storage (OAS) interface to access a content unit using an object identifier, the at last one computer having a first file system and a second file system, the first and second file systems each having a non-OAS storage interface that makes available a plurality of files; and at least one controller that: creates a snapshot of the first file system at least one point in time; receives, subsequent to creating the snapshot, an OAS access request from the application program to store a content unit, wherein the OAS access request is in a format compatible with the OAS interface; converts the OAS access request into at least one file system access request that is in a format compatible with the non-OAS storage interface provided by the first and second file systems; transmits the at least one file system access request to store the content unit to the first file system; and transmits the at least one file system access request to store the content unit to the second file system so that the content unit is stored in both the first and second file systems.

Another embodiment is directed to a method of processing content in a computer system comprising a file system that stores a plurality of files. The method comprises: employing a snapshot utility to create a snapshot of the file system at given point in time; and ensuring that, when data is deleted from the file system after creation of the snapshot of the file system, the deleted data exists in the snapshot only in encrypted form. A further embodiment is directed to at least one computer readable medium encoded with instructions that, when executed, perform the above-described method.

Another embodiment is directed to a computer system comprising: a file system that stores a plurality of files; and at least one controller that: employs a snapshot utility to create a snapshot of the file system at given point in time; and ensures that, when data is deleted from the file system after creation of the snapshot of the file system, the deleted data exists in the snapshot only in encrypted form.

DETAILED DESCRIPTION

Figure 1:
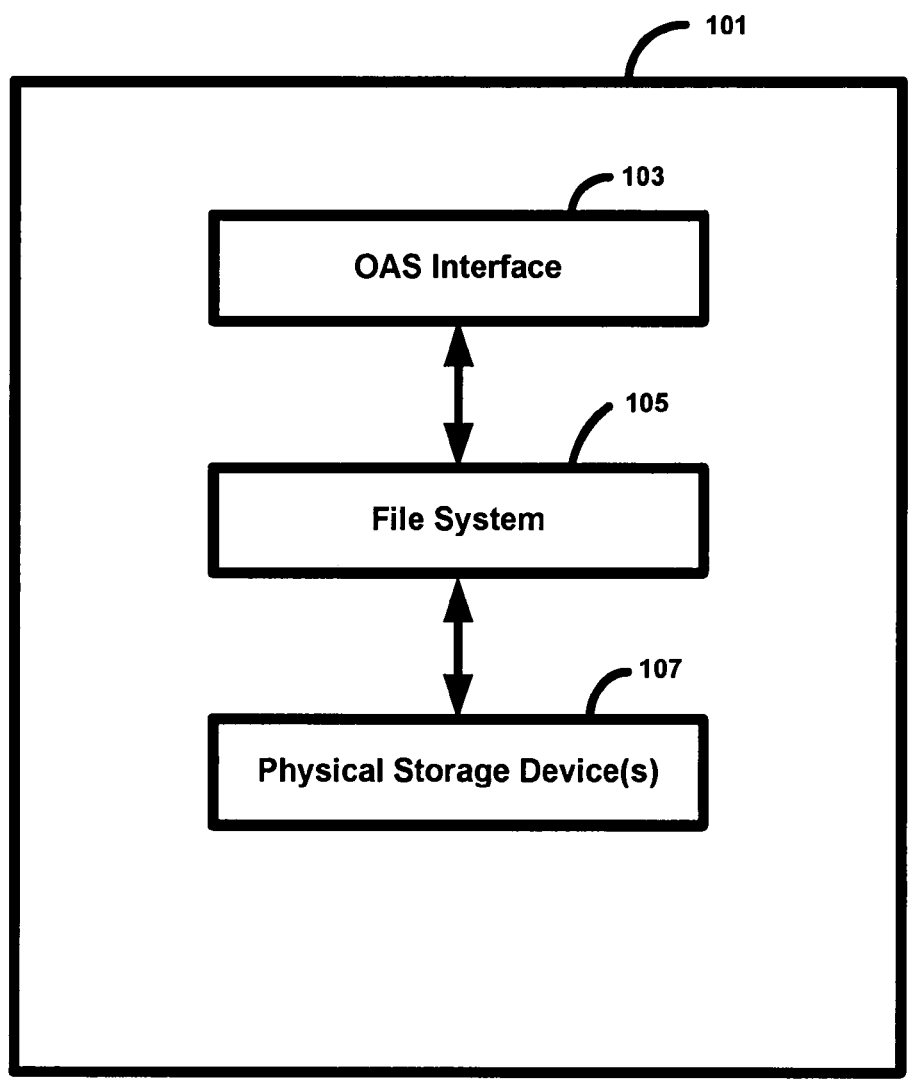
FIG. 1 is a block diagram of an illustrative object addressable storage (OAS) system, on which some embodiments of the invention may be implemented.

Applicants have appreciated that in any OAS system of the type described above, content stored on storage device(s) 107 may be lost due to corruption of the stored content, hardware failure of a storage device, or other reasons. Various techniques may be used to protect against such losses of content. One such technique is the use of a redundant array of independent disks (RAID), which is a data storage scheme in which content is shared and/or replicated across multiple independent disks. Thus, for example, storage devices 107 may be configured as a RAID array.

In another technique, instead of or in addition to configuring storage devices 107 as a RAID array, content stored on storage devices 107 may be replicated to a different storage system (e.g., at a remote location). This may be done in any suitable way, as the invention is not limited in this respect.

As discussed above, some OAS systems employ a file system that maintains metadata that maps logical files to physical storage locations at which the content logically stored in the files is physically stored on the physical storage devices, and may also indicate which blocks on the physical storage device(s) are being used to store file content and which are available to store file content.

The file system may be too large to store entirely in memory. Thus, the file system may keep only a portion of this metadata in memory, with the remainder being stored elsewhere (e.g., on one of the physical storage devices of the OAS system). The file system may load portions of the metadata from the physical storage devices (e.g., a disk drive) into memory as they are needed, and may page unneeded portions out to disk. Applicants have appreciated that, in conventional OAS systems of the type described above, while the file system metadata stored on disk may be protected from corruption or loss, for example, by RAID, replication, or in some other way, the file system metadata stored in memory is not. Thus, the file system metadata may become corrupted, which may result in incorrect or bad metadata being stored to disk and/or the file system being unable to locate the physical storage location(s) associated with a file because the metadata does not properly identify them. Embodiments of the invention are directed to protecting against corruption of a file system in an OAS system.

The techniques described herein are not limited to protecting against any particular types of corruptions, as numerous types are possible. For example, the file system metadata that indicates which blocks on the physical storage device are available and which blocks are in use may become corrupted such that blocks that are in use are indicated as available. This may result in the file system allocating blocks that its metadata indicates as available (but which are in actuality in use by an existing file) to a new file and overwriting the content of the existing file with the content of the new file. In addition, metadata that indicates at which physical blocks the content of a file is stored may be corrupted. This may result in the file system being unable to locate the content of the file.

File system metadata can become corrupted or inaccurate for any of a number of reasons. For example, if a power outage or system crash occurs before file system metadata stored and modified in memory is written to disk, the updated file system metadata may be lost, and the version of the file system metadata stored on disk may be inaccurate. In addition, two programs attempting to write to or modify a file at the same time may cause file system metadata corruption. Metadata corruption may also occur in situations where a program that is modifying a file crashes before the file system operation is complete. Bugs in the file system may be another cause of metadata corruption.

Figure 2:
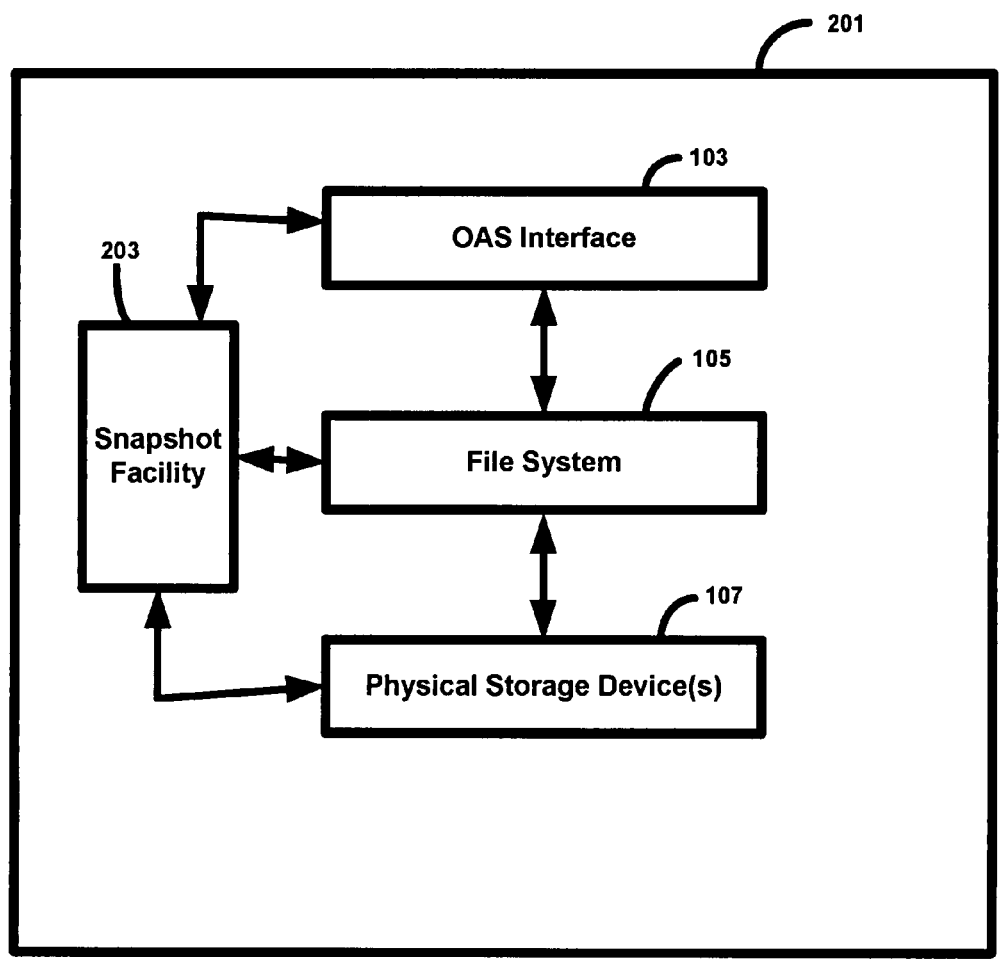
FIG. 2 is a block diagram of an OAS system that includes a snapshot facility, in accordance with one embodiment.

In some embodiments, the file system used by an OAS system may be protected using a snapshot facility that creates a snapshot of the file system. FIG. 2 is an example of a OAS system 201 in which a file system is protected using a snapshot facility. OAS system 201 includes an OAS Interface 103 and a file system 105. OAS Interface receives access requests (e.g., read and write requests) originated by application programs or other accessing entities for content units in a format compatible with OAS interface (e.g., identifying a content unit via an object identifier) and converts the access requests to requests that are in a format compatible with the interface presented by file system 105 (e.g., identifying files that store requested content by their filenames). File system 105 responds to the access requests by mapping logical file system names and locations to the corresponding physical locations on physical storage devices 107 where the requested content is logically stored.

OAS system 201 also includes a snapshot facility 203 to create one or more snapshots of file system 105. A file system snapshot is an image of the file system as it existed at a particular point in time. In embodiments of the invention that employ a snapshot facility to protect against file system metadata loss and/or corruption, the snapshot facility may create the snapshot in any suitable way, using any suitable technique. For example, the snapshot facility may create a snapshot of the file system at a particular point in time by creating a copy of the file system data (e.g., including the file system metadata and content stored in the files). Alternatively, the snapshot facility may use a copy-on-first-write technique to create the snapshot. In the copy-on-first-write technique, a point in time of the snapshot is selected. Each time a block of data in the file system is modified for the first time after the selected point in time, a copy of the block as stored prior to the modification is stored. Thus, the file system as it existed at the selected point in time may be recovered by replacing the blocks in the current version of the file system that were modified after the selected point in time with the copied blocks.

In some embodiments, prior to creating a snapshot, snapshot facility 203 may send a request to OAS Interface 103 to complete processing of any in-process write operations before creation of the snapshot and suspend new write operations (e.g., operations to store content units) until after the snapshot is created. In this manner, no write operations will be ongoing at the time of creation of the snapshot. This enables the file system to have a definite state at the time of creation of the snapshot.

In embodiments in which the snapshot facility creates a full copy of the file system at a selected snapshot time, the snapshot facility need not track modifications to the file system or make additional copies once the snapshot copy of the file system is created. When using the copy-on-first-write technique, the snapshot facility monitors modifications of the file system and creates copies of modified blocks after the selected snapshot time.

Snapshot facility 203 (as well as the snapshot facilities described in connection with other embodiments) may operate at the block level, the file system level, or any other suitable level, as the invention is not limited in this respect. In embodiments in which the snapshot facility operates at the block level, the snapshot facility may be unaware of the mapping between blocks of storage on the physical storage device and the logical files of the storage system. Thus, when a snapshot facility creates a snapshot, the snapshot may include blocks of physical storage that are not part of the file system. For example, in embodiments in which the snapshot facility creates a full copy of the file system, the snapshot facility may include in the snapshot all blocks of storage that are available to it, regardless of whether those blocks are used by the file system to store file data or file system metadata. In embodiments wherein the snapshot facility uses a copy-on-first-write technique, the snapshot facility may monitor any write requests sent to the physical storage device(s) and copy blocks that are modified for the first time since the creation of the snapshot (though these blocks may not store file data or file system metadata). Thus, in some embodiments, "a file system snapshot" may include data that is not associated with the file system (e.g., not file data or file system metadata).

In embodiments in which the snapshot facility operates at the file system level, the snapshot facility may intercept requests to the file system to modify and/or delete files and/or directories. When the snapshot facility intercepts a request to modify or delete a file, the snapshot facility may create a copy of the file and store the copy along with metadata (e.g., metadata indicating the time that the copy was created) and then forward the request to the file system.

In some embodiments OAS Interface 103 may control the snapshot facility. Thus, for example, the OAS Interface may select the times at which a snapshot is to be created and, at each selected time, may complete any in-progress write operations, suspend new write operations, and instruct the snapshot facility to create a snapshot of the file system.

Regardless of which of these (or any other) snapshot techniques are used, the time of creation of the snapshot, as used herein, refers to the selected snapshot time. Thus, for example, in embodiments in which the snapshot facility creates a snapshot by creating a full copy of the file system, if the selected snapshot time is time T1 (i.e., the snapshot stores the state of the file system as it existed at time T1), then the snapshot facility stores a copy of the file system as it existed at time T1 and the time of creation of the snapshot is time T1. In embodiments in which the snapshot facility uses a copy-on-first-write technique, if the selected snapshot time is T1 (i.e., the snapshot stores the state of the file system as it existed at time T1), then the time of creation of the snapshot is time T1, even though the snapshot facility may continue to monitor modifications to the file system and make copies of modified blocks for the snapshot.

In some embodiments, snapshot facility 203 may periodically create snapshots of the file system in OAS system 201. For example, snapshots of the file system may be created at some interval (e.g., either a regular interval or an irregular interval). Any suitable interval may be used, as the invention is not limited in this respect. The interval may be on the order of seconds, minutes, hours, days, weeks, months, or any other suitable period of time.

Figure 3:
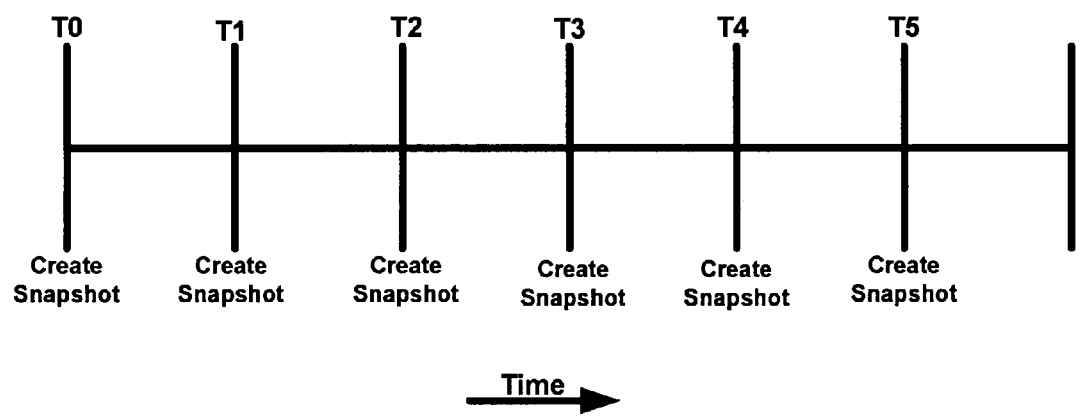
FIG. 3 is a diagram of a timeline illustrating the periodic creation of file system snapshots, in accordance with one embodiment.

As shown in the illustrative timeline of FIG. 3, a snapshot of file system 105 may be created at times T0, T1, T2, T3, T4, and T5. Thus, for example, if a file system corruption occurs in between times T1 and T2, the file system can be restored to its state at time T1 using the snapshot.

In some embodiments, when a snapshot of a file system is created, a file system check (e.g., a check performed by a utility such as the UNIX fsck utility) of the snapshot may be performed to verify that the snapshot of the file system is internally consistent. Any suitable check of the file system may be performed, as the invention is not limited in this respect. For example, the file system check may include checking that each allocated block is allocated to no more than one file, checking that each block that is currently in use by a file is indicated as an allocated block by the file system metadata, checking that each block that is indicated as available by the file system is not currently in use by any of the files, and/or any other suitable check. However, the invention is not limited to performing a file system check of the snapshot, as in some embodiments, when a snapshot of the file system is created it may be assumed that the snapshot stores a file system in a consistent state.

In embodiments in which a file system check is performed, if a snapshot is determined to be internally consistent by the file system check, then it may be treated as the most recent valid snapshot of the file system. Alternatively, if the snapshot is determined to be internally inconsistent, any inconsistencies may be corrected, and/or a new snapshot of the file system may be created. Performing a file system check of the snapshot is useful in verifying that the snapshot is valid and can be used to restore the file system, if desired.

Thus, in some embodiments, periodically creating a snapshot of the file system allows the system to be restored to a known state in the event a failure. Applicants have appreciated that when restoring the system to its state at particular point in time, modifications made to the system after that point in time (e.g., content units being stored, modified, and/or deleted), may be lost. Thus, for example, if a file system corruption occurs between time T3 and time T4, the file system may be restored to its state at time T3. However, any modifications made to the file system (e.g., creation of new files, modification of files, deletion of files) after time T3 may be lost. Thus, even though the content of a file created in between times T3 and T4 may be physically stored on the physical storage device(s), the file system may be unable to locate the content because the metadata that indicates which physical storage location(s) store the content is gone.

The window of time in between snapshots (e.g., the amount of time between times T1 and T2) affects the risk that modifications will be lost in the event that the system is restored from a snapshot. For example, if the amount of time between snapshots is large, there is a greater chance that one or more modifications were made in between snapshots. If the amount of time between snapshots is large, there is a smaller chance that modifications were made in between snapshots.

Applicants have appreciated that in some embodiments, it may be advantageous to identify any content lost as a result of a file system failure. Identifying lost content may enable a determination of the scope of the loss and/or enable re-creation of any lost content. Thus, in some embodiments if the OAS system experiences a failure (e.g., a file system corruption) that results in the loss of one or more content units, the OAS system may identify each content unit that was lost as a result of the failure. Though the content of the content units themselves may be still be lost, the OAS system can identify (e.g., via their object identifiers) those content units that were lost as a result of the failure, which can be advantageous for any of numerous reasons, examples of which are described above.

The identification of content units lost as a result of a failure in the OAS system may be accomplished in any suitable way, as the invention is not limited in this respect. In some embodiments, a snapshot of the file system may be periodically created (e.g., as shown in FIG. 3). The OAS system may track the object identifiers of content units stored to the OAS system in between snapshots. If a failure occurs that results in restoring the file system from the most recent valid snapshot, the OAS system may provide the object identifiers of the content units stored to the OAS system after the creation of the most recent valid snapshot.

Figure 4:
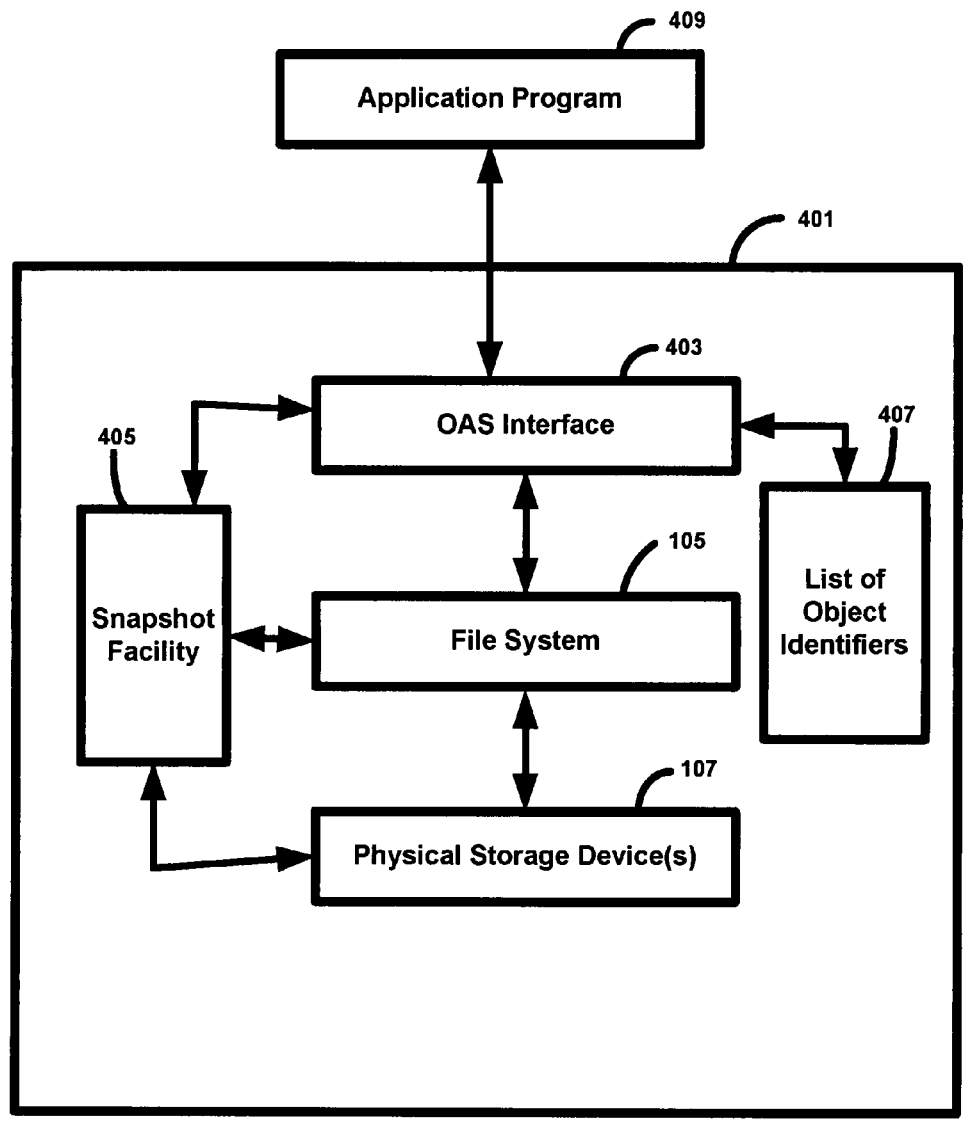
FIG. 4 is a block diagram of an illustrative OAS system in which an OAS Interface maintains a list of object identifiers of content units stored to the OAS system in between the creation of snapshots, in accordance with one embodiment.

For example, as shown in FIG. 4, illustrative OAS system 401 includes an OAS Interface 403 that stores content units in a file system 105 in response to requests generated by application program 409. As discussed above, file system 105 stores content received from OAS Interface 403 on physical storage device(s) 107. OAS system 401 further includes a snapshot facility 405 that periodically creates a snapshot of file system 105. As discussed above with respect to snapshot facility 203, snapshot facility 405 may create snapshots of the file system in any suitable way, using any suitable technique, and at any suitable interval.

When snapshot facility 405 creates a snapshot, it may request OAS Interface 403 to maintain a list 407 of object identifiers of content units stored after creation of the snapshot (or to identify such content units in any other suitable way). A file system check may then be performed on the snapshot to verify that it is internally consistent. If the snapshot is internally consistent, then the snapshot may be treated as the most recent valid snapshot and establish a new time period at which the file system is known to be good. If not, a new snapshot may be created for the relevant time period that will be internally consistent.

Thus, for example, snapshot facility 405 may create a snapshot of the file system at time T1 (FIG. 3). As discussed above, in some embodiments, snapshot facility 405 may request OAS Interface 403 to complete any in-progress write operations and suspend new write operations prior to creating the snapshot. Once snapshot facility 405 creates the snapshot, it may request that OAS Interface 403 maintain a list 407 of object identifiers written after creation of the most recent snapshot until creation of new more recent valid snapshot. In embodiments in which snapshot facility requests OAS Interface 403 to complete in-progress write operations and suspend new write operations, the snapshot facility may also instruct OAS Interface to resume processing write operations. The snapshot facility may then perform a file system check of snapshot to verify its consistency.

As discussed above, in some embodiments, the OAS Interface may control operation of the snapshot facility. Thus, for example, the OAS Interface may select the times at which a snapshot is to be created and, at each selected time, may complete any in-progress write operations, suspend new write operations, and instruct the snapshot facility to create a snapshot of the file system.

Further, it should be appreciated that performing a file system check of a snapshot to verify its consistency is optional and the invention is not limited in this respect. For example, in some embodiments, when a snapshot of the file system is created it may be assumed that the snapshot stores a file system in a consistent state.

OAS Interface 403 may store the object identifiers of contents stored to the OAS system after time T1 in list 407. If a failure occurs after time T1 but before time T2, the file system may be restored from the snapshot created at time T1 and the OAS system may provide the object identifiers in list 407 (e.g., to application program 409 or any other suitable entity) to identify the content units lost as a result of the failure.

Assuming that no failure occurs between times T1 and T2, snapshot facility 405 may create a new snapshot of the file system at time T2 and request the OAS Interface to create a new list of object identifiers of content units stored after time T2. After the snapshot is created, the snapshot facility may request the OAS system to create a new list of object identifiers of content units stored after time T2. In some embodiments, once it is determined, e.g. via a file system check, that the snapshot created at time T2 is internally consistent, the previous list of object identifiers (e.g., the list created between times T1 and T2) may be deleted. In other embodiments, the previous list of object identifiers may be kept and stored.

In the example of FIG. 4, application program 409 accesses OAS system 403 directly. However, the invention is not limited in this respect, as application program 409 may access OAS system 403 in any suitable way, including via one or more software layers. For example, in some embodiments, application program 409 may access OAS system 403 via an application program interface (API) that presents an interface that the application program may use to send access requests to OAS system 403, but shields the application program from the details of communicating with the OAS system, such as, for example, the protocols used to communicate with the OAS system.

It should be appreciated from the discussion above that maintaining information about which content units are stored after the creation of a snapshot provides an additional degree of protection over simply periodically creating a snapshot (as this information may assist in assessing the scope of lost data resulting from restoring from a snapshot or re-creating content units lost as a result of restoring from a snapshot). However, in some embodiments, there may be a trade off between this additional degree of protection and conserving processing and/or storage resources. For example, maintaining the information identifying content units stored after the creation of snapshot may use additional processing and storage resources. Thus, in some situations where it is desired to conserve processing and/or storage resources, it may be desired to simply periodically create snapshots of the file system without maintaining information about which content units are stored after the creation of a snapshot.

Applicants have appreciated that thought it may be useful to identify content units lost as a result of a failure, it may be desirable, in some situations, to be able to recover the lost content units, rather than simply identify them. Thus, in some embodiments of the invention, content units that are lost as a result of a failure (e.g., a file system corruption) of an OAS system may be recovered. This may be done in any suitable way, as the invention is not limited in this respect.

For example, in some embodiments, a snapshot of the file system may be periodically created, in a manner similar to that discussed above in connection with FIGS. 2 and 4. In addition, a new file system (referred to herein as a file system mirror) may be created and content units stored to the OAS system may be stored in both the original file system and in the file system mirror. Thus, if a failure occurs sometime after the creation of the most recent valid snapshot and the file system is restored using the most recent valid snapshot, content units stored to the OAS system after creation of the snapshot may be recovered from the file system mirror.

Figure 5:
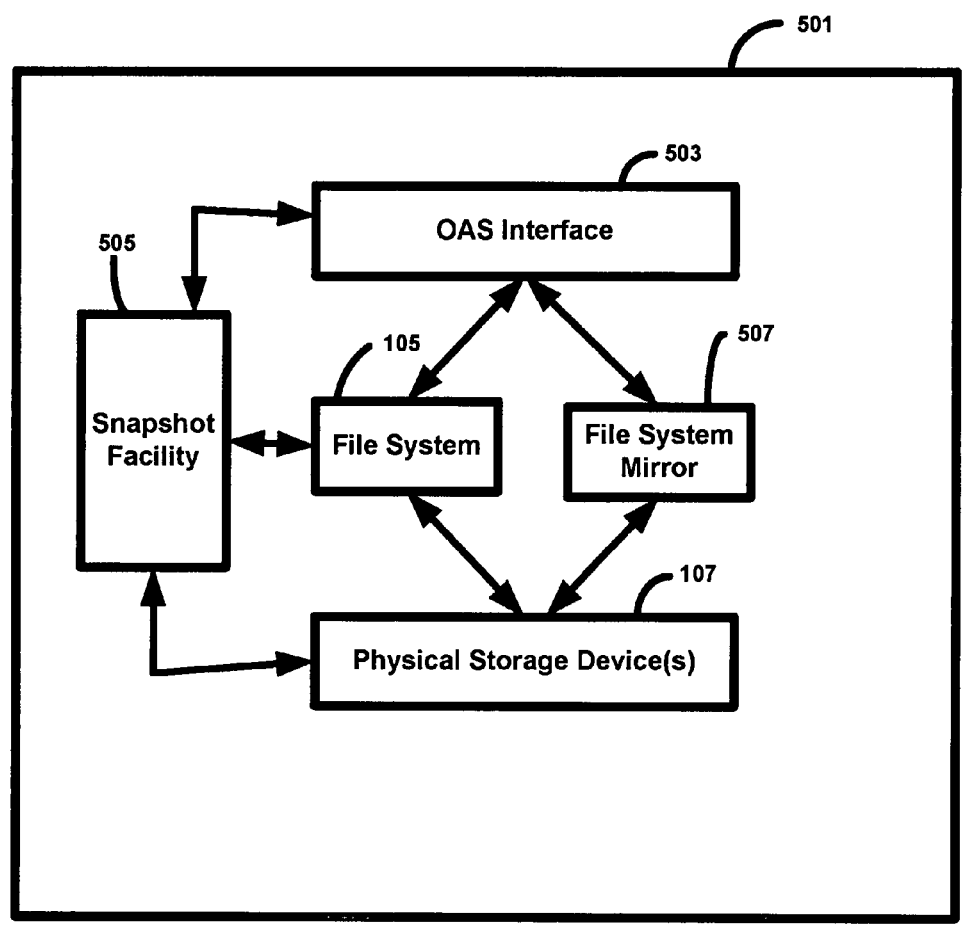
FIG. 5 is a block diagram of an illustrative OAS system in which an OAS Interface mirrors write requests to two file systems, in accordance with one embodiment.

That is, as shown in FIG. 5, illustrative OAS system 501 includes an OAS Interface 503 that stores content units in two file systems (i.e., file system 105 and file system mirror 507). File system 105 and file system mirror 507 store the content of the content units as blocks on physical storage device(s) 107. In some embodiments, file system mirror 507 stores only those files stored in file system 105 after the creation of the snapshot, but does not store files stored in file system 105 before the creation of the snapshot. OAS Interface also includes a snapshot facility 505 that periodically creates a snapshot of file system 105 (e.g., in a manner similar to that discussed above in connection with snapshot facility 405 and snapshot facility 203). Because a file system check may be performed on the most recent file system snapshot to verify that the file system can be restored from this snapshot, it may be determined that the file system in its state at the time this snapshot was created can be recovered. Thus, in some embodiments, only content units stored after the creation of the most recent valid snapshot need be stored in the file system mirror.

As discussed above, it should be appreciated that performing a file system check of a snapshot to verify its consistency is optional and the invention is not limited in this respect. For example, in some embodiments, when a snapshot of the file system is created it may be assumed that the snapshot stores a file system in a consistent state.

Once snapshot facility 505 creates a snapshot of file system 105, it may send a request to OAS Interface 503 to mirror any writes to file system mirror 507 during the window between the creation of the most recent valid snapshot until the time at which the next snapshot is created and verified as internally consistent. That is, for any content unit that OAS Interface 503 stores in file system 105, OAS Interface 503 may also store the content unit in file system mirror 507. If a failure occurs resulting in restoring the file system from a snapshot, content units stored to the OAS system after the snapshot was created may be recovered from file system mirror 507.

OAS Interface 503 may mirror writes to file system mirror 507 in any suitable way, as the invention is not limited in this respect. For example, in some embodiments, when OAS Interface 503 receives a request to store a content unit that includes the content of the content unit, OAS Interface 503 may temporarily store the content of the content unit in a buffer and transmit a request to file system 105 to store the content in the buffer in a file. OAS Interface may then transmit a request to file system mirror 507 to store the content in the buffer in a file in file system mirror 507. In other embodiments, when OAS Interface 503 receives a request to store a content unit that includes the content of the content unit, the OAS Interface may temporarily store the content in a first buffer and then copy the content from the first buffer into a second buffer. The OAS Interface may then send a request to file system 105 to store the content of the first buffer in a file in file system 105 and may send a request to file system mirror 507 to store the content of the second buffer in a file in file system mirror 507.

File system mirror 507 may have any suitable directory structure, as the invention is not limited in this respect. For example, in some embodiments, file system mirror 507 may have a parallel directory structure to file system 105. That is, file system mirror 507 may have a replica of the directory structure of file system 105, such that every directory in file system 105 has a parallel directory in file system mirror 507. If additional directories are created in file system 105 after a snapshot is created, those same directories may be created in file system mirror 507. Thus, when the OAS Interface stores a content unit as a file, having a particular filename, in a particular directory in file system 105, the OAS Interface may store the content units as a file in the same directory in file system mirror 507 and give the file the same filename as the corresponding file in file system 105.

In some embodiments, file system mirror 507 need not have the same directory structure as file system 105. For example, in some embodiments, file system mirror 507 may have a flat (i.e., as opposed to hierarchical directory structure) directory structure and all content units stored in file system mirror 507 may be stored in a single directory. When the OAS Interface stores the content of a content unit in a file in file system mirror 507, OAS Interface may give the file a filename that identifies the filename and file system location of the corresponding file in file system 105.

In some embodiments OAS Interface 503 may control the snapshot facility. Thus, for example, the OAS Interface may select the times at which a snapshot is to be created and, at each selected time, may complete any in-progress write operations, suspend new write operations, and instruct the snapshot facility to create a snapshot of the file system.

As discussed above, a failure may occur after creation of a snapshot that results in the OAS system restoring file system 105 using the snapshot and file system mirror 507. This restoration may be performed in any suitable way, as the invention is not limited in this respect. For example, if a failure occurs in between time T1 and time T2 (FIG. 3), the OAS system may restore file system 105 using the snapshot created at time T1 (e.g., by copying the blocks from the snapshot to the file system blocks, or in any other suitable way). As a result, file system 105 is restored to the same state that it was in at time T1, but does not have any of the files stored in file system 105 between time T1 and time T2. However, any files stored in file system 105 between time T1 and time T2 are stored in file system mirror 507. Thus, any such files in file system mirror 507 may be copied from the file system mirror into the restored file system. This may be done in any suitable way, as the invention is not limited in this respect.

For example, in some embodiments in which file system mirror 507 includes a parallel directory structure to file system 105, files stored in file system mirror 507 may be located and copied to the parallel location in file system 105. In embodiments in which the filename and location of a file in file system 105 is encoded in the filename of the corresponding file in file system mirror 507, each file in file system mirror 507 may be copied to the location in file system 105 encoded in its filename and may be stored in a file at this location with the filename encoded in the filename of the corresponding file in file system 105.

When a file system mirror is no longer needed, any suitable action may be taken with respect to it. For example, if a snapshot of file system 105 is created at time T1, file system mirror 507 may store files stored in file system 105 starting at time T1 up until the next valid snapshot of file system 105 is created (e.g., at time T2). At time T2, a new file system mirror may be created in which the OAS Interface stores any files stored in file system 105 between times T2 and T3 (when a new snapshot is created). Thus, the previous file system mirror is no longer needed. Thus, in some embodiments, the previous file system mirror may discarded. In other embodiments, the previous file system mirror may be maintained.

Applicants have appreciated that in some situations, when a file is deleted from a file system it is desired that the content of the file no longer exist on the storage system, particularly in situations where the file is "shredded" upon deletion. Shredding of a file refers to deleting the logical file from the file system, but also deleting the physical content of the file on the underlying physical storage device(s) by overwriting the blocks at which the physical content is stored with other data (e.g., all zeros or one or more patterns of zeros and ones designed to hinder data recovery).

Applicants have further appreciated that when a snapshot of a file system is created and a file in the file system is later shredded, the content of the file may still exist in the snapshot, even though it may be desired that the content of the file no longer exist anywhere on the storage system.

Thus, some embodiments of the invention are directed to inhibiting recovery of deleted content from a snapshot. In some embodiments this is achieved by encrypting content stored in a snapshot. Only the encrypted snapshot is stored, such that the content of any file that is shredded after creation of the content unit exists on the storage system (i.e., in the snapshot) only in encrypted form.

Figure 6:
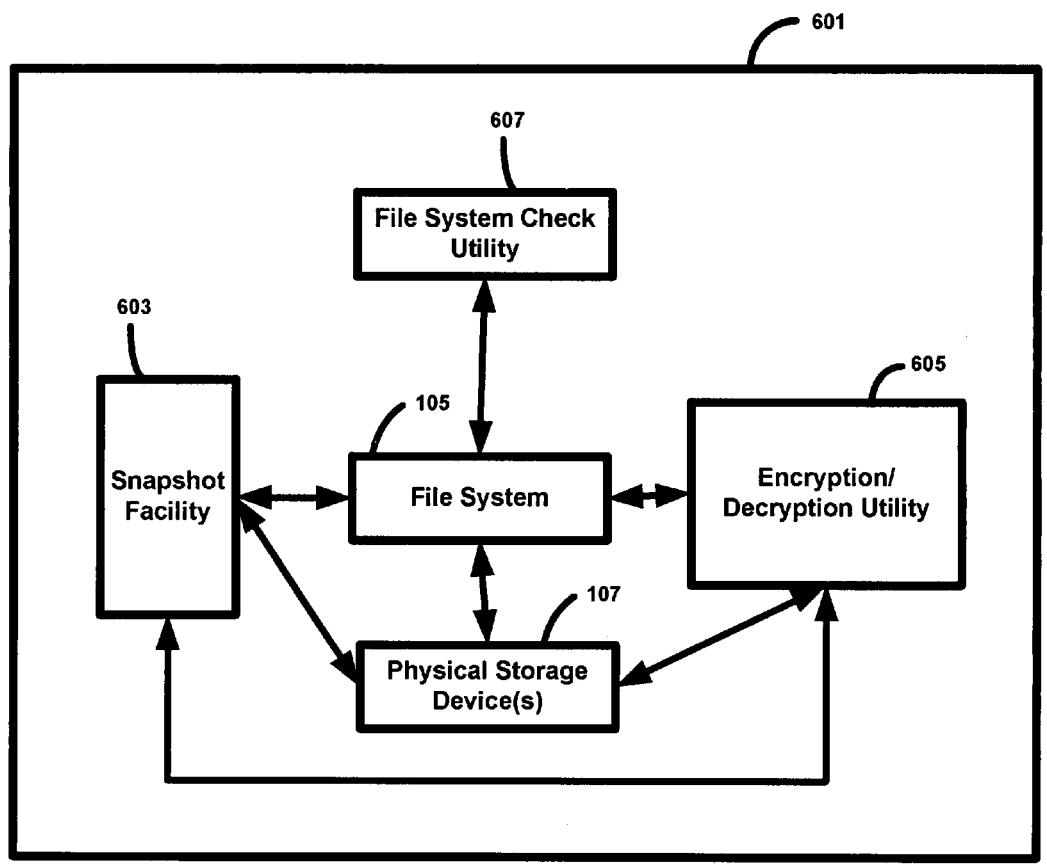
FIG. 6 is a block diagram of illustrative storage system that includes a utility for encrypting and decrypting snapshots.

For example, as shown in FIG. 6, storage system 601 includes a file system 105, a snapshot facility 603, and encryption/decryption utility 605. Storage system 601 may be any suitable type of storage system, as the invention is not limited in this respect. For example, storage system 601 may be a block I/O storage system, an OAS system, or any other suitable type of storage system.

In some embodiments, a user and/or administrator of storage system 601 may configure the storage system to shred any content that is deleted. That is, for example, if a file in file system 105 is deleted from the file system, the underlying data of the file stored on the physical storage device(s) of the storage system may be deleted. In some embodiments, the user and/or administrator may configure the storage system to shred all deleted content or only particular subsets of the content. For example, a user or administrator might configure the storage system to shred deleted files that store word processing documents, but not to shred deleted files that include e-mails.

In embodiments in which the storage system is configured to shred deleted content, the snapshot facility may use encryption/decryption utility 605 to encrypt any content that is moved or copied from file system 105 and onto a snapshot location (e.g., the physical storage device(s) of storage system 601).

When snapshot facility 603 creates a snapshot of file system 105, snapshot facility 603 may pass the snapshot to encryption/decryption utility 605. Utility 605 may encrypt the snapshot and store it on the storage system. Utility 605 may encrypt the snapshot in any suitable way. For example, utility 605 may encrypt the snapshot using an encryption key that it generated or that it received from a user or administrator of the storage system.

In embodiments in which the snapshot facility creates a full copy of the file system, encryption/decryption utility 605 may encrypt the entire copy using the encryption key. In embodiments in which the snapshot facility uses a copy-on-first-write technique, only those blocks copied on a write command may be encrypted (e.g., using the encryption key). In this manner, data deleted from file system 105 is not duplicated in the snapshot.

In some embodiments, when an encrypted file system snapshot is created using encryption/decryption utility 605, a file system check utility 607 may be internally run within storage system 601. This may be done in any suitable way, as the invention is not limited in this respect. For example, the file system may access the physical disks via snapshot facility 603. That is, in response to a request from the file system, snapshot facility 603 may employ encryption/decryption utility 605 to access the physical storage and decrypt the data. Once the encryption/decryption utility 605 has decrypted the content on the snapshot version of the file system, file system check utility 607 can then verify the integrity of the snapshot version of the file system. It should be appreciated, however, that the invention is not limited to performing a file system check on the snapshot of the file system as, in some embodiments, it may be assumed that the snapshot is a valid snapshot.

In some situations, it may be desired to restore file system 105 from the encrypted snapshot version. This may be done in any suitable way, as the invention is not limited in this respect. For example, in some embodiments, utility 605 may retrieve the snapshot from the physical storage device(s). That is, snapshot facility 603 may be unable to directly read the physical blocks that store the snapshot version of the file system because the content of the snapshot is encrypted. Thus, the snapshot facility may employ encryption/decryption utility 605 to decrypt the content using the encryption key and return the unencrypted data to snapshot facility 603. Snapshot facility 603 may use the unencrypted snapshot to restore the file system.

In some embodiments, encryption/decryption utility 605 may be used exclusively by the internal file system check utility 607 and snapshot facility 603, and any attempt by another entity (such as an application program) may result in the entity being unable to access decrypted content. This may be done to protect the encrypted content from unauthorized access, and can be accomplished in any number of ways. For example, this may be accomplished by blocking application program access to the snapshot version of the file system and/or returning encrypted content to any entity other than the file system check utility and/or snapshot facility. Further, because the content stored thereon is encrypted, it may be difficult to access the content by physically removing the physical storage device(s) and reading the content directly from the physical devices.

The above-described embodiments of the present invention can be implemented on any suitable computer, and a system employing any suitable type of storage system.

Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus | 11/324,726 | Jan. 3, 2006 |

TABLE 1-continued

| Title | Ser. No. | Filing Date |
|---|---|---|
| For Mounting A File System | | |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus | 11/483,494 | Jul. 10, 2006 |
| For Storing Content | | |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |
| Methods And Apparatus For Selecting A Storage Zone For A Content Unit | 11/644,428 | Dec. 22, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing content in a computer system comprising a file system that stores a plurality of files, the method comprising:
    employing a snapshot utility, executing on at least one hardware processor of the computer system, to create a snapshot of the file system at given point in time; and
    ensuring that, when data is deleted from the file system after creation of the snapshot of the file system, the deleted data exists only in encrypted form and only in the snapshot by shredding the deleted data and encrypting the snapshot.

2. The method of claim 1, wherein the file system is disposed on an object addressable storage (OAS) system having an OAS layer that receives OAS access requests from an application program for content units in a format compatible with the OAS interface and converts the OAS access requests into file system access requests that are in a format compatible with the non-OAS storage interface provided by the file system.

3. The method of claim 1, wherein the act of encrypting the snapshot further comprises an act of encrypting the snapshot using an encryption key.

4. The method of claim 3, wherein the encryption key is provided by a user of the computer system or an administrator of the storage system.

5. The method of claim 3, wherein the act of encrypting the snapshot is performed by an encryption utility and wherein the encryption key is generated by the encryption utility.

6. At least one non-transitory computer readable medium encoded with instructions that, when executed, perform a method of processing content in a computer system comprising a file system that stores a plurality of files, the method comprising:
    employing a snapshot utility to create a snapshot of the file system at given point in time;
    ensuring that, when data is deleted from the file system after creation of the snapshot of the file system, the deleted data exists only in encrypted form and only in the snapshot by shredding the deleted data and encrypting the snapshot.

7. The at least one non-transitory computer readable medium of claim 6, wherein the file system is disposed on an object addressable storage (OAS) system having an OAS layer that receives OAS access requests from an application program for content units in a format compatible with the OAS interface and converts the OAS access requests into file system access requests that are in a format compatible with the non-OAS storage interface provided by the file system.

8. The at least one non-transitory computer readable medium of claim 6, wherein the act of encrypting the snapshot further comprises an act of encrypting the snapshot using an encryption key.

9. The at least one non-transitory computer readable medium of claim 8, wherein the encryption key is provided by a user of the computer system or an administrator of the storage system.

10. The at least one non-transitory computer readable medium of claim 8, wherein the act of encrypting the snapshot is performed by an encryption utility and wherein the encryption key is generated by the encryption utility.

11. A computer system comprising:
    a file system that stores a plurality of files; and
    at least one hardware processor that executes processor-executable instructions to:
        employ a snapshot utility to create a snapshot of the file system at given point in time; and
        ensure that, when data is deleted from the file system after creation of the snapshot of the file system, the deleted data exists only in encrypted form and only in the snapshot by shredding the deleted data and encrypting the snapshot.

12. The computer system of claim 11, wherein the computer system comprises an object addressable storage (OAS) system having an OAS layer that receives OAS access requests from an application program for content units in a format compatible with the OAS interface and converts the OAS access requests into file system access requests that are in a format compatible with the non-OAS storage interface provided by the file system, and wherein the file system is disposed on the OAS system.

13. The computer system of claim 11, wherein the at least one controller encrypts the snapshot using an encryption key.

14. The computer system of claim 13, wherein the encryption key is provided by a user of the computer system or an administrator of the storage system.

15. The computer system of claim 13, wherein the at least one controller encrypts the snapshot using an encryption utility and wherein the encryption key is generated by the encryption utility.

* * * * *